United States Patent
Dürnay et al.

(10) Patent No.: US 9,738,749 B2
(45) Date of Patent: Aug. 22, 2017

(54) POLYURETHANE CASTING COMPOUND FOR PRODUCING WEAR PROTECTION COATINGS IN CASTING HOUSE APPLICATIONS

(71) Applicant: SIKA TECHNOLOGY AG, Baar (CH)

(72) Inventors: Wolfgang Dürnay, Bad Urach (DE); Florian Gneiting, Nürtingen (DE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/430,050

(22) PCT Filed: Oct. 1, 2013

(86) PCT No.: PCT/EP2013/070389
§ 371 (c)(1),
(2) Date: Mar. 20, 2015

(87) PCT Pub. No.: WO2014/053458
PCT Pub. Date: Apr. 10, 2014

(65) Prior Publication Data
US 2015/0232608 A1    Aug. 20, 2015

(30) Foreign Application Priority Data
Oct. 1, 2012    (EP) .................................... 12186891

(51) Int. Cl.
| | | |
|---|---|---|
| *C08G 18/76* | (2006.01) | |
| *C08K 5/42* | (2006.01) | |
| *B22C 21/00* | (2006.01) | |
| *B22C 3/00* | (2006.01) | |
| *B22C 19/00* | (2006.01) | |
| *C08G 18/32* | (2006.01) | |
| *C09D 175/12* | (2006.01) | |
| *B22C 9/00* | (2006.01) | |
| *B22C 1/22* | (2006.01) | |

(52) U.S. Cl.
CPC ........ *C08G 18/7621* (2013.01); *B22C 1/2273* (2013.01); *B22C 3/00* (2013.01); *B22C 9/00* (2013.01); *B22C 19/00* (2013.01); *B22C 21/00* (2013.01); *C08G 18/324* (2013.01); *C08K 5/42* (2013.01); *C09D 175/12* (2013.01)

(58) Field of Classification Search
CPC ................................ B22C 1/2273; B22C 9/00
USPC .......................................................... 427/133
See application file for complete search history.

(56) References Cited

U.S. PATENT DOCUMENTS

| 5,212,032 A * | 5/1993 | Wilson | .................... C08G 18/10 430/125.3 |
| --- | --- | --- | --- |
| 2002/0091222 A1 | 7/2002 | Viegas et al. | |
| 2003/0236381 A1* | 12/2003 | Yokota | .................... C08G 18/10 528/65 |
| 2010/0314067 A1* | 12/2010 | Yazaki | .................... C08G 18/10 162/358.2 |
| 2010/0319874 A1* | 12/2010 | Thiel | .................... B22C 1/2273 164/526 |
| 2011/0190444 A1* | 8/2011 | Thiel | .................... B22C 1/2273 524/871 |

FOREIGN PATENT DOCUMENTS

| DE | 1280493 B | 10/1968 |
| --- | --- | --- |
| EP | 1178097 A1 | 2/2002 |

OTHER PUBLICATIONS

Apr. 7, 2015 International Preliminary Report on Patentability issued in International Patent Application No. PCT/EP2013/070389.
Jan. 22, 2014 International Search Report issued in International Patent Application No. PCT/EP2013/070389.
Jul. 5, 2016 Office Action issued in European Application No. 13 770 911.9.
Oct. 27, 2016 Office Action issued in Chinese Application No. 201380052770.4.
Feb. 7, 2017 Office Action issued in European Patent Application No. 13 770 911.9.

* cited by examiner

*Primary Examiner* — William Phillip Fletcher, III
(74) *Attorney, Agent, or Firm* — Oliff PLC

(57) ABSTRACT

The present invention relates to multi-component compositions including an isocyanate component and an amine component, wherein the isocyanate component includes a prepolymer, obtainable from toluene isocyanate and a polytetramethylene polyol, and the amine component includes a dialkylthio aryl diamine and possibly a polytetramethylene oxide polyamine. Corresponding compositions can be advantageously used as flowable or spreadable resin systems for producing surface protection coatings in casting house applications and are characterized by a significantly improved resistance to abrasion in comparison with conventional casting resin systems based on hexamethylene diisocyanate and dimethyl thiotoluene diamine.

20 Claims, No Drawings

POLYURETHANE CASTING COMPOUND FOR PRODUCING WEAR PROTECTION COATINGS IN CASTING HOUSE APPLICATIONS

TECHNICAL FIELD

The invention relates to a multi-component composition comprising an isocyanate component and an amine component, wherein the isocyanate component comprises a prepolymer obtainable from toluene diisocyanate and a polytetramethylene polyol and the amine component comprises a dialkylthio aryl diamine and possibly a polytetramethylene oxide polyamine. Corresponding compositions can be advantageously used as casting resins for casting house model making, wherein the compositions according to the invention are especially suitable as protection coatings for core boxes and models for sand core or sand mold production. In addition, the present invention relates to a method for producing models for casting house applications, wherein as part of this process a multi-component composition as described in the preceding is applied to or cast onto a molded part and cured.

PRIOR ART

Core boxes and die plates for metal casting can be produced using known methods from metal or by machining from prefabricated polymeric block materials. Polymeric materials have the advantage over pure metal tools of more rapid manufacturing as well as a longer lifetime and greater ease of repair and replacement.

The use of liquid casting resin systems that may be cast directly during mold making in variable sizes offers greater flexibility compared to the prevailing methods and is also associated with the advantage that they do not require extensive mechanical equipment. The production of surface protection coatings for plates and core boxes of sand molding in casting house applications therefore takes places in most cases by manual casting or application of corresponding resin systems and can be performed directly in the model-making companies or departments. Suitable resins for such applications must be able to be processed under room temperature conditions, and thus must range within certain limits in terms of their reactivity and viscosity. In addition, they must offer high manipulation safety, i.e., must have no tendency to form blisters when exposed to moisture.

For more than 30 years, polyurethane casting resins based on dicyclohexylmethane diisocyanate prepolymers and diphenylmethane diamine (DDM) have been used successfully as curing agents for producing surface protection coatings in casting house applications. For example, such a resin was available under the trade name of Biresin® U1320 from Sika. These materials were especially characterized by outstanding properties in terms of wear resistance and workability. However, because of the potential physiologic risks presented by diphenylmethane diamine, REACH registration was not performed by the manufacturers of this product. Therefore the formulated products could no longer be processed after August 2014.

As an alternative for DDM-based casting resin systems, in the recent past systems based on HDI/dimethyl thiotoluene diamine have been tested and marketed. It was found, however, that problems arose in the practical use of these casting resins, for example disadvantageous shrinkage behavior of the materials, problematic clinging of sand to the plates, and low wear resistance. For this reason the alternatives without DDM available on the market to date are not suitable for use as casting resins.

To continue to make use of the advantages of casting resin systems for metal casting applications, it is consequently necessary to find an alternative for diphenylmethane diamine-based casting resin systems. Thus, a need exists for casting resin systems and compounds that exhibit appropriate processing characteristics, especially good flowability. At the same time, these casting compounds should exhibit improved shrinkage behavior compared with the previously available DDM-free casting resin systems, insofar as possible should not have a tendency toward sand adhesion, and have high wear resistance. Advantageously, the systems should have similar characteristics like the DDM-based materials known form the prior art, but should not contain any toxic substances such as diphenylmethane diamine.

Polyurethanes based on aromatic polyisocyanates and polyalkylene glycols such as polytetramethylene glycol, the curing of which takes place by addition of dialkylthio aryl diamines are described in the prior art for various applications.

For example, US 2010/314067 A1 describes shoe pressing belts in the papermaking sector which have a fiber-reinforced base provided with a polyurethane coating. However, the polyurethanes cured with dialkylthio aryl diamines have a less advantageous fracture behavior compared with polyurethanes hardened with 1,4-butadiene.

U.S. Pat. No. 5,212,032 discloses corresponding polyurethanes as coatings for elements for transferring toner images from one carrier surface to another. The polyurethanes have a relatively high Shore hardness of 90 and good resistance to high atmospheric humidity.

Finally, US 2003/236381 A1 discloses the use of corresponding polyurethanes as coatings for golf balls. Good flight characteristics of balls made with such coatings were demonstrated.

All of these disclosures, however, have in common the fact that the content of the constituents based on isocyanates, and thus also the content of the constituents based on the curing agent, is relatively low. This has considerable effects on the properties of the cured polyurethanes because of the ratio of the content of aromatic constituents to the aliphatic constituents.

In addition, from EP 1 178 097 A1 rubber adhesives based on polytetrahydrofuran-aminobenzoate esters, dialkylthio aryl diamines and trimers of hexamethylene diisocyanate are known, with the aid of which rubber substrates, for example in tires, may be bonded. However, such systems have inadequate abrasion properties for use in core boxes for casting house applications.

Finally it is known, for example from DE 1 280 493, that polyurethanes can be used as binding agents for sand in casting house molds. But as a rule these systems also have unfavorable abrasion characteristics, and thus are not suitable for the preparation of surface protection coatings.

The present invention provides a solution to the problems described in the preceding, in that it provides a composition that has comparable properties to the surface protection coatings conventionally produced with diphenylmethane diamines.

DESCRIPTION OF THE INVENTION

A first aspect of the present invention relates to a multi-component composition comprising an isocyanate component and an amine component, wherein the isocyanate component comprises a prepolymer of toluene diisocyanate and a polytetramethylene polyol and the amine component comprises a dialkylthio aryl diamine, preferably a dialkyl thiotoluene diamine, and possibly a polytetramethylene oxide polyamine.

A further aspect of the present invention relates to the use of a multi-component composition as described in the preceding as a casting resin for casting house model making.

In addition, the present invention relates to models and/or core boxes for casting house applications which are characterized in that they have a coating, especially a wear protection coating made of a cured composition obtainable from a multi-component composition as described in the preceding. Finally the present invention relates to a method for producing models and/or core boxes for casting house applications which is characterized in that a multi-component composition as described in the preceding is mixed and applied to or cast onto a molded part and cured.

The term "amine component" in connection with the present invention is to be understood as meaning that the constituents of the amine component should be spatially separated from the constituents of the isocyanate component during the storage of the composition.

In addition to the isocyanate and amine components mentioned, the multi-component composition may also contain additional components. However, it is preferred if the multi-component composition consists essentially of the isocyanate and the amine component.

The isocyanate component, as previously described, comprises a prepolymer, obtainable from toluene diisocyanate (TDI) and a polytetramethylene polyol. In the context of the present invention it has proven advantageous if this prepolymer has an isocyanate content in the range of about 7 to 10%, preferably about 8 to 9.5%. The isocyanate content is calculated as the ratio of the total weight of all isocyanates in the prepolymer to the total weight of the prepolymer.

In the context of the present invention it was also found that the polytetramethylene polyol in the prepolymer of the isocyanate component preferably has a molecular weight (Mw) in the range of about 250 to 1500, of preferably about 250 to 1000, and particularly preferably of about 650 to 1000. If the polytetramethylene polyol has a molecular weight (Mw) of less than 250, this will mean that the material will be difficult to process. If a polytetramethylene polyol with a molecular weight of more than 1500 is used, the resulting products will not have optimal stiffness and durability.

The viscosity of the first component at 25° C. is preferably in the range of 6000 to 20000 mPa·s, particularly preferably in the range of 7000 to 14000 mPa·s. These viscosities can be determined in the context of the invention using a rotational viscometer with a Z3 DIN rotor and a shear gradient of D=10 at 25° C. It was found that in particular, viscosities of less than 6000 mPa·s after mixing of the isocyanate and amine component lead to low initial viscosities of the mixtures. This is especially disadvantageous in the case of casting resin applications, since bubbles and air inclusions can more readily form in these compositions. This leads to a high need for repair of the products. Furthermore, casting resins with very low viscosity can also penetrate into very narrow gaps, which often cannot be avoided in casting house applications. Therefore, after curing of the casting compound, increased effort is required to eliminate undesirable overhangs.

It is also preferred if the dialkylthio aryl diamine is a dialkyl thiotoluene diamine, wherein the alkyl radical is preferably an alkyl radical with 1 to 6 carbon atoms. Particularly preferably, the dialkylthio aryl diamine is present in the form of dimethyl thiotoluene diamine. A product of this type is available, for example, under the trade name of Ethacure 300 from Albemarle Corp. USA. In the context of the present invention it was found that the thioalkyl groups lead to a necessary slowing of the polyaddition with the isocyanate prepolymer, so that the product has a flowability needed for processing for an adequate time period. It was possible to show in the comparison experiments that, for example, analogous dialkyl toluene diamines cure too rapidly and thus are not suitable for corresponding applications. The dialkylthio aryl diamine can react with isocyanates with formation of urea bridges.

The content of dialkyl thioaryl diamine in the amine component falls within the framework of the present invention, particularly in the range of about 30 to 70 wt. %, especially in the range of about 40 to 65 wt. %, and particularly preferably in the range of about 45 to 55 wt. %, based on the total weight of the amine component.

In the context of the present invention it has been found that the addition of a polytetramethylene oxide polyamine is associated with particular advantages. Thus, optimal properties of casting resins suitable for casting house applications can be established with the aid of this additional amine. The polytetramethylene oxide polyamine can advantageously be present in the amine component in addition to the dialkylthio aryl diamine, wherein it can be spatially separated from this component, or advantageously is present in one or more containers in a mixture with this constituent.

The polytetramethylene oxide polyamine is preferably present in the form of a diamine. It is apparent to the person skilled in the art that the amine must be present in the polytetramethylene oxide polyamine as a primary or secondary amine, since a tertiary amine cannot react with polyisocyanates resulting in curing. The amine can be bound to the polytetramethylene oxide directly or via a linker (which does not consist of a tetramethylene unit). The amine is particularly preferably attached to the polytetramethylene oxide via a linker molecule. In a most particularly preferred embodiment, the linker is a 4-carboxyphenyl linker. Corresponding products are available, for example, from Air Products under the trade name of Versalink.

For the polytetramethylene oxide polyamine it is likewise preferred if the calculated molecular weight (Mw) of the polytetramethylene oxide fraction of this component in the range of about 250 to 1500, particularly preferably in the range of about 250 to 1000, and most preferably in the range of 650 to 1000.

The quantity of the polytetramethylene oxide polyamine preferably falls in the range of about 5 to 25 wt. %, and especially of about 8 to 13 wt. %, based on the total weight of the amine component.

In the context of the present invention it has proven advantageous if the amine component, in addition to the constituents listed, contains a non-saponifiable plasticizer. Advantageously, this plasticizer is present in the form of an alkyl sulfonate, particularly preferably a phenol alkyl sulfonate. Suitable products are sold, for example, under the trade name of Mesamoll® II by Lanxess, Germany.

If the amine component is formulated using an additional non-saponifiable plasticizer, this is present in the amine component preferably at a content in the range of about 20 to 60 wt. % and particularly preferably in the range of about 30 to 45 wt. %, based on the total weight of the amine component.

In the context of the present invention it is also preferred if the isocyanate and amine components are present and/or are mixed in a weight ratio in the range of about 5:1 to 1:1, particularly preferably in the range of about 4:1 to 2:1 and most preferably in the range of about 3:1 to 2.2:1. Furthermore, the exact mixing ratio also depends on the quantity of amine in the amine component and the quantity of isocyanate (NCO) in the isocyanate component. In the context of the present invention it is preferred if the stoichiometric ratio NCO/NH$_2$ in the total multi-component composition is in the range of 1:1 to 1.1:1, especially in the range of 1.02:1 to 1.05:1. A slight excess of isocyanate guarantees that despite the reaction with atmospheric humidity the amines present in the composition react completely to form ureas.

In a particularly preferred embodiment of the present invention the multi-component composition comprises 200 to 300 parts by weight of an isocyanate component which contains a prepolymer based on toluene diisocyanate and polytetramethylene glycol with a molecular weight (Mw) in the range of 650 to 1000 and with an isocyanate content in the range of 7 to 10%, and 100 parts by weight of an amine component containing dimethyl thiotoluene diamine and polytetramethylene oxide di-p-aminobenzoate with a molecular weight (Mw) of about 650.

A further aspect of the present invention relates to the use of a multi-component composition as described in the preceding as a casting resin for casting house model making.

The present invention also relates to models for casting house applications, especially for metal casting applications and particularly preferably for iron and/or aluminum casting applications, which is characterized in that it has a coating made from a composition obtainable by curing a multi-component composition as described in the preceding. In a particularly preferred embodiment, the model is a model for producing sand molds or core boxes for the preparation of sand cores. It is also preferred for the model to have a coating of the cured composition with a thickness in the range of about 0.1 to 25 mm, especially about 6 to 15 mm, and particularly preferably 6 to 10 mm.

Finally, an aspect of the present invention relates to a method for producing models and core boxes, respectively, for casting house applications, which is characterized in that a multi-component composition as described in the preceding composition is mixed and applied and/or cast onto a molded part and cured. The molded part advantageously has a shape that is at least partially identical to the shape of sand molds that are to be produced later. Within the method it is also preferred if the composition is cast into a cavity that is formed by the molded part and a container or carrier that surrounds the molded part on the side that has the shape to be reproduced. The container and the molded part consequently form a cavity into which the multi-component composition is introduced after mixing the components. In this way the composition forms an impression of the molded part after curing. Preferably, the cavity has a mean thickness in the range of about 5 to 25 mm, especially about 6 to 15 mm, and particularly preferably 6 to 10 mm.

In the following, the present invention will be illustrated with some examples, which however should not limit the scope of protection of the present invention in any way.

Examples

In the following, various casting resins were formulated according to the compositions indicated in Table 1. All numerical statements are in parts by weight.

TABLE 1

| | Example | | | | | | | HDI 1 | HDI 2 |
|---|---|---|---|---|---|---|---|---|---|
| | 1 | 2 | 3 | 4 | 5 | 6 | 7 | | |
| Isocyanate component | | | | | | | | | |
| TDI-PTMEG prepolymer, 9.0 NCO %[1] | 250 | 238 | 227 | 264 | | | 264 | | |
| TDI-PTMEG prepolymer, 7.0 NCO %[2] | | | | | 555 | | | | |
| HDI biuret 23 NCO % | | | | | | | | 65-70 | |
| HDI trimer 11 NCO % | | | | | | | | | 264 |
| Amine component | | | | | | | | | |
| Dimethyl thiotoluene diamine | 52 | 50 | 47 | 55 | 100 | 58 | 58 | 15-20 | 70 |
| Polytetramethylene oxide di-p-amino-benzoate [3] | 10 | 10 | 10 | 10 | | | | 80-85 | |
| Phenol alkyl sulfonate | 38 | 40 | 43 | 35 | | 42 | 42 | | 30 |

[1] Imuthane ™ PET-75D;
[2] Imuthane ™ PET-60D;
[3] Versalink ® P-650.

The processing properties of these compositions were studied. The properties were determined using the following protocols.

The viscosities of the isocyanate component and the mixture of isocyanate and amine components were determined at 25° C. using a Physica MC10 rotational viscometer with a Z3 DIN rotor and a shear gradient of D=10. The viscosity of the curing agent component was determined at 25 C using the same method, but a shear gradient of 100.

The gel time is determined at 20° C. using a Tecam GT4 gel timer. For this purpose the thermally equilibrated components are weighed in according to the specified mixing ratio. The material is then mixed for about 1 minute until homogeneity is achieved. Then, the mixture is poured into a container up to the 100 ml mark, placed in the insulated box of the gel timer and the stirring rod positioned in the center of the container. The measurement is started after 1 minute. The measurement is finished when this is indicated by the instrument. The gel time corresponds from the time from the beginning of mixing to the end of the measurement.

The pot life was measured based on a 500 g test batch at room temperature (20 to 23° C.) in the non-insulated polyethylene cup.

The linear shrinkage corresponds to the change in length relative to the initial length of a cast shrinkage rod in percent. The shrinkage test rods have dimensions of 500 mm length, 40 mm width and 10 mm height. The test materials were removed from the mold after 16 hours (ejected) and the change in length of the rods determined after storage for 14 days at 23° C. and 50% relative humidity.

The Shore hardness was determined according to ISO 868.

The tensile strength and elongation at break were determined according to ISO 527.

The modulus of elasticity was determined according to ISO 178.

The abrasion was determined according to ISO 4649.

The results of the measurements of the properties are given in Table 2 below.

TABLE 2

| | Standard | Unit | Requirement | Example 1 | 2 | 3 | 4 | 5 | 6 | 7 | HDI 1 | HDI 2 |
|---|---|---|---|---|---|---|---|---|---|---|---|---|
| Processing data | | | | | | | | | | | | |
| viscosity @ 25° C. | Iso comp. | mPa·s | | 14000 | 14000 | 14000 | 14000 | 7400 | 9000 | 14000 | 2200 | 5500 |
| | Amine comp. | | | 270 | 260 | 250 | 290 | 650 | 150 | 150 | 4500 | 200 |
| | Mixture | | Sufficiently flowable at RT | OK | OK | OK | OK | OK | OK | OK | OK | OK |
| Gel time @ 20° C. (100 ml) | | min | ≥25 min | 20 | 20 | 22 | 18 | 20 | 20 | 18 | 25 | 25 |
| Pot life @ RT (500 g) | | min | ≥15 min | OK | OK | OK | OK | OK | OK | OK | OK | OK |
| Physical properties (SC 23/50) | | | | | | | | | | | | |
| Shore hardness @ RT | ISO 868 | | D 56 | D 62 | D 60 | D 59 | D 65 | D 58 | D 56 | D 64 | D 65 | D 62 |
| Tensile strength | ISO 527 | MPa | | 50 | 45 | 40 | 50 | 35 | | | 22 | 25 |
| Elongation at break | ISO 527 | % | | 300 | 300 | 300 | 300 | 300 | | | 100 | 70 |
| Modulus of elasticity, bending | ISO 178 | MPa | ~200-600 MPa | 200 | 180 | 160 | 250 | 140 | | | 400 | 250 |
| Abrasion | ISO 4649 | mm³ | ≤150 | 70 | 70 | 70 | 70 | 70 | 150 | 80 | 200 | 200 |
| Linear shrinkage, 16 h ejection time | | % | <0.17% | 0.12 | 0.12 | 0.12 | 0.13 | 0.16 | 0.16 | 0.15 | 0.12 | 0.1 |
| Curing behavior | | | Without brittle phase and without sink marks | OK | OK | OK | OK | OK | OK | OK | Not OK | Not OK |

OK = meets requirements

It is apparent that the compositions according to the invention exhibit significantly superior abrasion resistance compared with compositions based on HDI with corresponding amine components. Nevertheless, comparable values for hardness, tensile strength, elongation at break and modulus of elasticity could be achieved with the compositions according to the invention. The shrinkage is comparable to that of corresponding HDI-based materials. Sink marks could frequently be observed for the compositions based on HDI; these were often seen as dents on the surface of the cast resin. They were present in 40 to 50% of the cast products and make them unsuitable for direct use. In addition, brittle phases were often observed with HDI-based resins, as a result of incomplete curing of the resin. Since the resins are frequently applied on plastic carriers, later heat treatment to achieve complete curing is impossible, since this could lead to deformation of the plastic carrier. All of the resins according to the invention were free from sink marks and brittle phases after curing. It is also apparent that when dimethyl thiotoluene diamine was used without polytetramethylene polyamine, optimal flowability could not be achieved in all instances. Example 6 showed a lower abrasion resistance than in the case of the compositions containing both dimethyl thiotoluene diamine polytetramethylene polyamine.

The invention claimed is:

1. A model and/or core box for casting house applications, the model and/or core box having a coating made of a cured composition obtainable from a multi-component composition, the multi-component composition comprising:
    an isocyanate component and an amine component, wherein
        the isocyanate component comprises a prepolymer, obtainable from toluene diisocyanate and a polytetramethylene polyol, and
        the amine component comprises a dialkylthio aryl diamine.

2. The model and/or core box according to claim 1, wherein the model and/or core box is a model for producing sand molds or a core box for producing sand cores.

3. The model and/or core box according to claim 1, wherein the coating made of the cured multi-component composition has a thickness in the range of about 6 to 15 mm.

4. The model and/or core box according to claim 1, wherein the composition essentially consists of the isocyanate and amine components.

5. The model and/or core box according to claim 1, wherein the polytetramethylene polyol has a calculated molecular weight (Mw) in the range of 500 to 1500.

6. The model and/or core box according to claim 1, wherein the dialkylthio aryl diamine is present in the form of dimethyl thiotoluene diamine.

7. The model and/or core box according to claim 1, wherein the amine component additionally contains a polytetramethylene oxide polyamine in the form of a diamine.

8. The model and/or core box according to claim 1, wherein the polytetramethylene oxide part of the polytetramethylene oxide polyamine has a calculated molecular weight (Mw) in the range of 500 to 1500.

9. The model and/or core box according to claim 1, wherein the amine component additionally has a non-saponifiable plasticizer.

10. The model and/or core box according to claim 9, wherein the amine component has a dialkylthio aryl diamine content in the range of about 30 to 70 wt. %, a polytetramethylene oxide polyamine content in the range of about 5 to 25 wt. %, and a non-saponifiable plasticizer content in the range of 20 to 60 wt. %.

11. The model and/or core box according to claim 9, wherein the non-saponifiable plasticizer is in the form of an alkyl sulfonate.

12. The model and/or core box according to claim 1, wherein the isocyanate and amine components are present in a weight ratio in the range of about 4:1 to 2:1.

13. The model and/or core box according to claim 1, further comprises a casting resin or surface resin for casting house model making.

14. The model and/or core box according to claim 1, wherein the prepolymer has an isocyanate content in the range of 7 to 10%.

15. The model and/or core box according to claim 1, wherein the dialkylthio aryl diamine is a dialkyl thiotoluene diamine.

16. The model and/or core box according to claim 1, wherein the amine component further comprises a polytetramethylene oxide polyamine.

17. A method for producing models and/or core boxes for casting house applications, the method comprising:
    mixing a multi-component composition,
    applying or casting the multi-component composition onto a molded part, and
    curing the multi-component composition that was applied or casted onto the molded part; wherein the multi-component composition comprises:
    an isocyanate component and an amine component, wherein
        the isocyanate component comprises a prepolymer, obtainable from toluene diisocyanate and a polytetramethylene polyol, and
        the amine component comprises a dialkylthio aryl diamine.

18. The method according to claim 17, wherein the dialkylthio aryl diamine is a dialkyl thiotoluene diamine.

19. The method according to claim 17, wherein the amine component further comprises a polytetramethylene oxide polyamine.

20. The method according to claim 17, wherein applying or casting the multi-component composition onto a molded part comprises casting the multi-component composition into a cavity that is formed by the molded part and a container or carrier that surrounds the molded part on a side that has a shape to be reproduced.

* * * * *